United States Patent [19]

Gonsior et al.

[11] Patent Number: 5,312,844
[45] Date of Patent: May 17, 1994

[54] METHOD OF PRODUCING POLYURETHANE INJECTION MOLDED IN-LINE SKATE WHEELS

[75] Inventors: Stanley W. Gonsior, Minnetonka; Dennis L. Hvam, Eden Prairie, both of Minn.

[73] Assignee: S&W Plastics, Inc., Eden Prairie, Minn.

[21] Appl. No.: 61,920

[22] Filed: May 14, 1993

[51] Int. Cl.⁵ .............................................. C08J 9/00
[52] U.S. Cl. ................................ 521/99; 152/DIG. 18; 301/5.3; 301/55; 301/56; 301/59; 280/11.12; 280/11.19; 425/542; 425/549; 425/554
[58] Field of Search ................. 521/99; 152/DIG. 18; 301/5.3, 55, 56, 59; 280/11.12, 11.19; 425/542, 547, 549, 554

[56] References Cited

U.S. PATENT DOCUMENTS

| | | | |
|---|---|---|---|
| 3,689,091 | 9/1972 | Nagin | 280/11.12 |
| 4,699,432 | 10/1987 | Klamer | 301/5.3 |
| 4,844,491 | 7/1989 | Wheelwright | 280/11.2 |
| 4,909,523 | 3/1990 | Olson | 280/11.2 |
| 5,028,058 | 7/1991 | Olson | 280/11.22 |
| 5,048,848 | 9/1991 | Olson et al. | 280/11.22 |
| 5,133,591 | 7/1992 | Skaggs et al. | 301/63 PW |

Primary Examiner—John Kight, III
Assistant Examiner—Duc Truong
Attorney, Agent, or Firm—Amy J. Hoffman; Robert A. Elwell; Harold D. Jastram

[57] ABSTRACT

A method of producing injection molded in-line skate wheels is disclosed. The method includes heating an injection molding unit suitable for injecting molten polyurethane, placing a thermoplastic polyether type polyurethane into the unit and heating the polyurethane until it is molten or at about 380° to about 460° F. A polyurethane hub is placed in a mold whereby the mold and hub are of shapes and sizes suitable for producing in-line skate wheels. The hub-containing mold is heated to about 50° to about 100° F. in order to prevent the molten polyurethane from prematurely hardening. Once the mold is heated, about 46 to about 50 g of polyurethane is injected into the mold at about 75 to about 100 psi. The polyurethane is cooled to about 120° to about 130° F. to allow the polyurethane to harden and the resulting wheel is removed from the mold.

34 Claims, 6 Drawing Sheets

METHOD OF PRODUCING POLYURETHANE INJECTION MOLDED IN-LINE SKATE WHEELS

FIELD OF THE INVENTION

The present invention relates to methods of injection molding a particular polymer, polyurethane. Specifically, the invention relates to injection molding wheels suitable for in-line skates from polyurethane. More specifically, the invention relates to injection molding a thermoplastic polyether type polyurethane whereby the molded product is suitable for in-line skate wheels.

BACKGROUND OF THE INVENTION

Since the invention of the first pair of in-line skates in the early 1980's, in-line skating is rapidly increasing in popularity and is successfully competing and co-existing with traditional roller skating. In fact, in-line skating has become so popular that nearly a worldwide market now purchases in-line skates. To this end, the in-line skate industry is continually developing new skates to meet the consumer's demands for lighter, faster skates.

Wheels of in-line skates are a critical component which manufacturers constantly strive to improve. Early wheels were manufactured of high friction material which resulted in prohibitively slow wheels. The industry quickly started producing the wheels from materials which had a lower coefficient of friction against the pavement and thereby created faster wheels.

In addition to demanding faster wheels, in-line skaters have another demand. In order to be suited for in-line skating, the wheels must contain a certain amount of rebound. One subjective test for rebound is to bounce a wheel on a hard surface such as a table top. If the wheel bounces, it may have desirable and suitable rebound properties for use in an in-line skate. Rebound is necessary to absorb the unevenness of pavement, loose pebbles and gravel which a skater may encounter when skating. The rebound of the wheels in part acts as a "shock absorber" for the person wearing the skates.

Currently, in-line skate wheels are produced only by the method of casting or pour molding from thermoset polyurethane. Thermoset polyurethanes are characterized by rebound suitable for use in in-line skates, however, thermoset polyurethanes are not injection moldable. Two other problems are associated with thermoset polyurethanes for in-line skate wheels. First, the material requires a 3 minute cure time which slows the manufacturing time of in-line skate wheels and raises manufacturing costs. Second, thermoset plastics are not recyclable once they have cured. That is, once a thermoset plastic has set it cannot be melted and recast and it is therefore not environmentally sound to use thermoset plastics.

Several other problems are associated with cast molding of in-line skate wheels. First, the process of cast molding is very labor-intensive. Second, cast molded wheels require machining after the wheels are molded to remove excess material. Third, besides temporal constraints, quality control problems also exist with cast wheels because air bubbles are often trapped in the cast-molded wheels. Air entrapped wheels obviously must be discarded or scrapped thus increasing production costs and creating nonrecyclable waste.

In addition to manufacturing problems, the currently available wheels are also inferior because adhesives are routinely used to bond the tread to the hub. With time and use, the adhesive breaks down causing the tread portion of the wheel to pull away from the hub. If this occurred while a skater was skating on the wheels, such an event could injure a skater.

A desirable method of manufacturing in-line skate wheels would be characterized by a method faster than the currently used cast-molding method. Such a method would also eliminate quality control problems such as air bubbles in the wheels, and further would create a safer wheel by eliminating the hub portion separating away from the tread portion. Such a method would additionally result in polyurethane wheels having necessary rebound.

SUMMARY OF THE INVENTION

Until now, it has been impossible to injection mold acceptable in-line skate wheels made of polyurethane. Many wheel manufacturers have unsuccessfully attempted to injection mold in-line skate wheels of polyurethane. The thermoset polyurethane material which is currently used to produce the wheels is not suitable for injection molding. Conversely, material which is injection moldable lacks the rebound necessary for in-line skates. Thus, all attempts to injection mold in-line skate wheels have failed.

The present invention is aimed at solving the foregoing problems and it is an object of the invention to provide a method to injection mold in-line skate wheels of polyurethane. The inventive method is quickly completed and produces in-line skate wheels in about 50 to about 60 seconds which is a significant advance over 3 minutes required for cast molding in-line skate wheels.

In one embodiment, the present invention is a method of producing injection molded in-line skate wheels by the steps of heating an injection molding device suitable for injecting molten polyurethane. The injecting nozzle is heated to about 380° to about 460° F. A polyether type polyurethane is heated to between about 380° to about 460° F. A polyurethane hub is preferably placed into a mold which is suitable for molding in-line skate wheels. The hub-containing mold is heated to between about 50° to 110° F. before about 46 to about 50 g of polyurethane is injected into the mold at about 75 to about 100 psi. The polyurethane is then cooled to between about 120° and 130° F., and the molded polyurethane, which is in the shape of an in-line skate wheel, is removed from the mold.

DETAILED DESCRIPTION OF THE INVENTION

Figure 10:
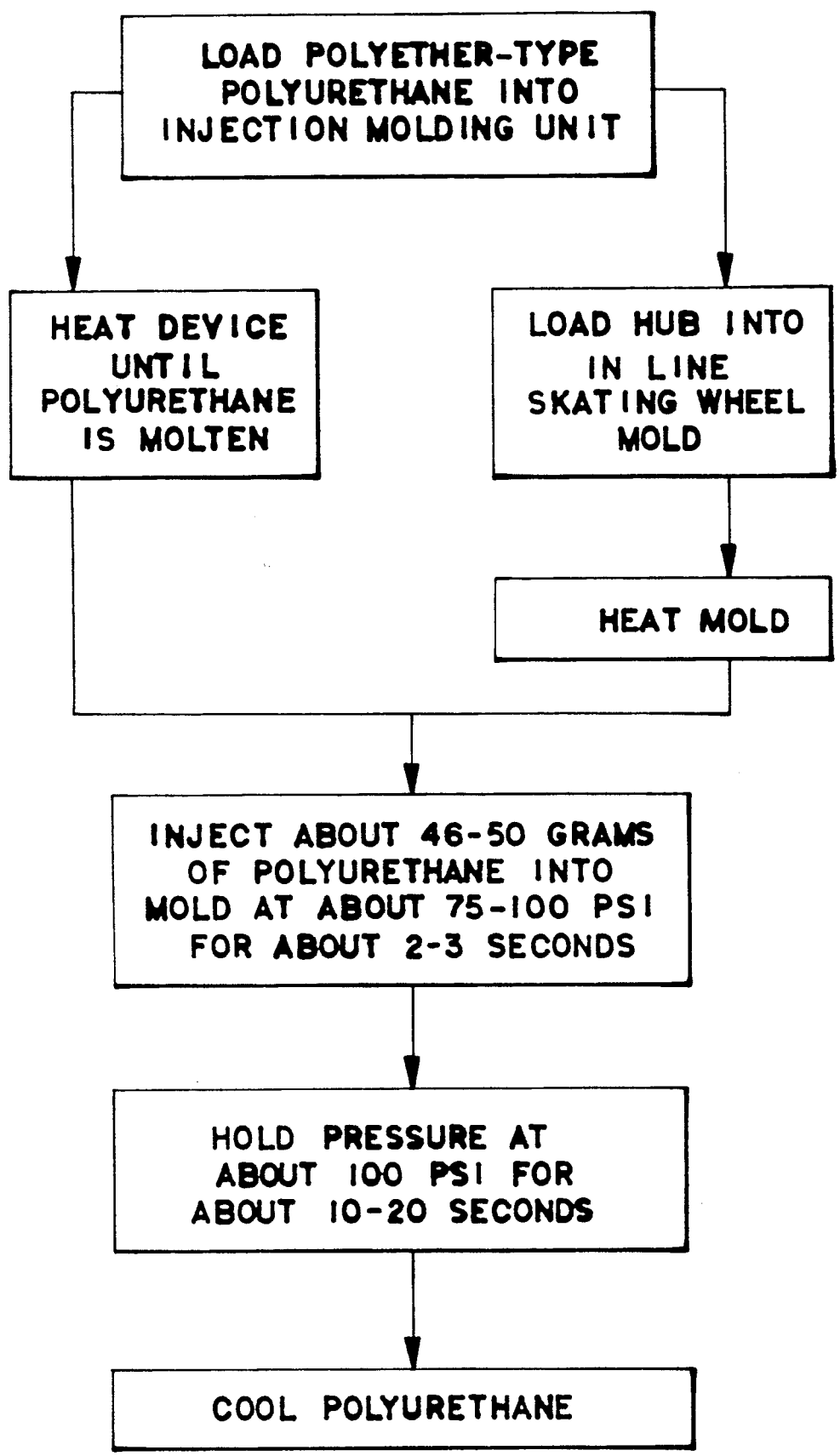
FIG. 10 is a flow chart showing the method of the present invention.

FIG. 10 generally shows a flow diagram of the method of the present invention for producing injection molded in-line skate wheels.

In the method, a thermoplastic polyether type polyurethane is preferably used. Choosing the particular polyurethane for the present invention is very important. For optimum performance of the final product, a polyether type polyurethane having a Shore Hardness of preferably about 78A to about 82A and most preferably about 80A is used. The polyurethane further has a specific gravity of about 1.00 to 1.20 and preferably about 1.10. The preferred polyurethane further has a Bay Shore rebound of about 58 to about 62 and preferably about 60. An example of a suitable material is Estanee® 58881 as produced by B. F. Goodrich. The invention anticipates that a combination of polymeric materials may be used in the current method which include at least in part a thermoplastic polyether based polyurethane.

Bay Shore rebound is tested by dropping a standard weight onto the material and the percent rebound of the weight is measured. In the case of the preferred polyurethane, the standard weight rises to 60% of the height from which it was dropped thus yielding a Bay Shore rebound of 60.

The preferred material is quite different than materials commonly used to produce in-line skates. A Shore Hardness of about 80A is quite soft as far as polyurethanes are concerned. Specific gravity is a measure of the density of a material. Polyurethanes commonly used to produce in-line skate wheels have specific gravities in the range of 1.10–1.45. Thus, the polyurethane material used for the method of the present invention has a density which is low on the scale of densities of polyurethanes commonly used to produce in-line skates.

An advantage of the present invention is that it preferably uses a thermoplastic polyurethane. As earlier stated, thermoplastic polyurethane is recyclable as compared to thermoset polyurethane, which has traditionally been used to cast mold in-line skate wheels, is not recyclable. Thus, the wheels produced by the method of the present invention may be melted and remolded and are therefore more environmentally sound as compared to the prior art wheels. One could therefore recycle worn wheels produced by the method of the present invention. Additionally, any scrap resulting from practicing the method is also recyclable.

An injection unit suitable for injecting molten polyurethane is first loaded with polyurethane. An example of such a device is the Injection Unit manufactured by Toyo Machinery & Metal Co., Ltd. of Osaka, Japan and distributed by Maruka U.S.A. Inc. of Pine Brock, N.J. One skilled in the art will recognize that many injection units similar to the Toyo model also work in the method of the present invention and the invention is not limited to using the above identified injection unit.

As is well known in the art of injection molding, injectors are comprised of a number of components. Injectors commonly contain a nozzle, a chamber with a front, center, and rear zone and a throat connecting the chamber to the injection cylinder which contains the screw. The chamber generally contains three zones—the front, center, and rear zones. In the present method, the injector is heated so the components preferably having temperatures in the following ranges. The injecting nozzle and front zone of the chamber is at about 390° to about 420° F., the center and rear zones of the chamber are at about 330° to about 390° F. The throat of the device is at about 110° to about 190° F. The injector is heated in any manner suitable such as by electrical heaters located in the body of the injector or by placing the entire injector unit into a furnace. Preferably, the injector unit used contains its own heating device.

The zones of the chambers are preferably heated to a temperature which causes the loaded polyurethane to reach a temperature of about 380° to about 460° F., and preferably about 380° to about 410° F. Although one skilled in the art will recognize that a polyether type polyurethane is molten at a temperature below 380°, flow characteristics of the polyurethane are optimized when the material is in the above-stated temperature range.

The polyurethane of the present invention is preferably injected at a temperature of between about 400° and 440° F. In this temperature range the material flows easily and readily conforms to the mold tooling and to the hub. Moreover, when the thermoplastic polyurethane is at this temperature it allows the injecting to proceed at lower pressures than are required if the polyurethane is cooler. The polyurethane also bonds to the hub when the polyurethane is in the desired temperature range which is discussed more fully below. Another advantage of maintaining the polyurethane at this temperature is that the appearance of the molded product is enhanced because the molded wheel lacks weld lines and cold flow marks. Although such manufacturing marks do not affect performance, consumers routinely find such marks unappealing.

Figure 7:
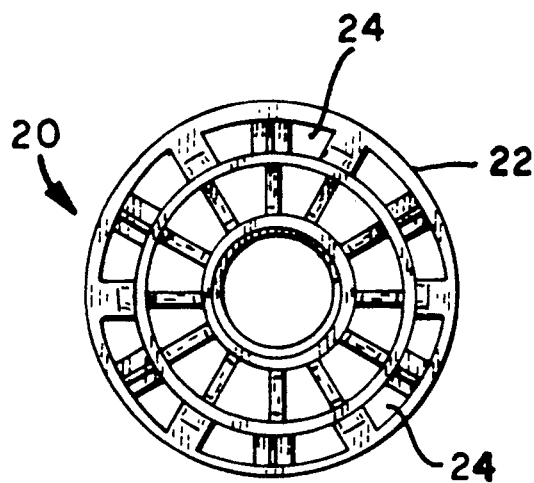
FIG. 7 is a front elevational view of a hub.
Figure 8:
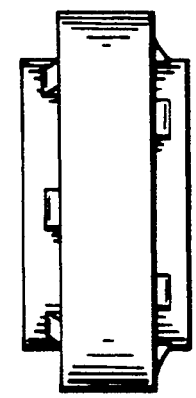
FIG. 8 is an end elevational view of a hub used in the wheel.
Figure 9:
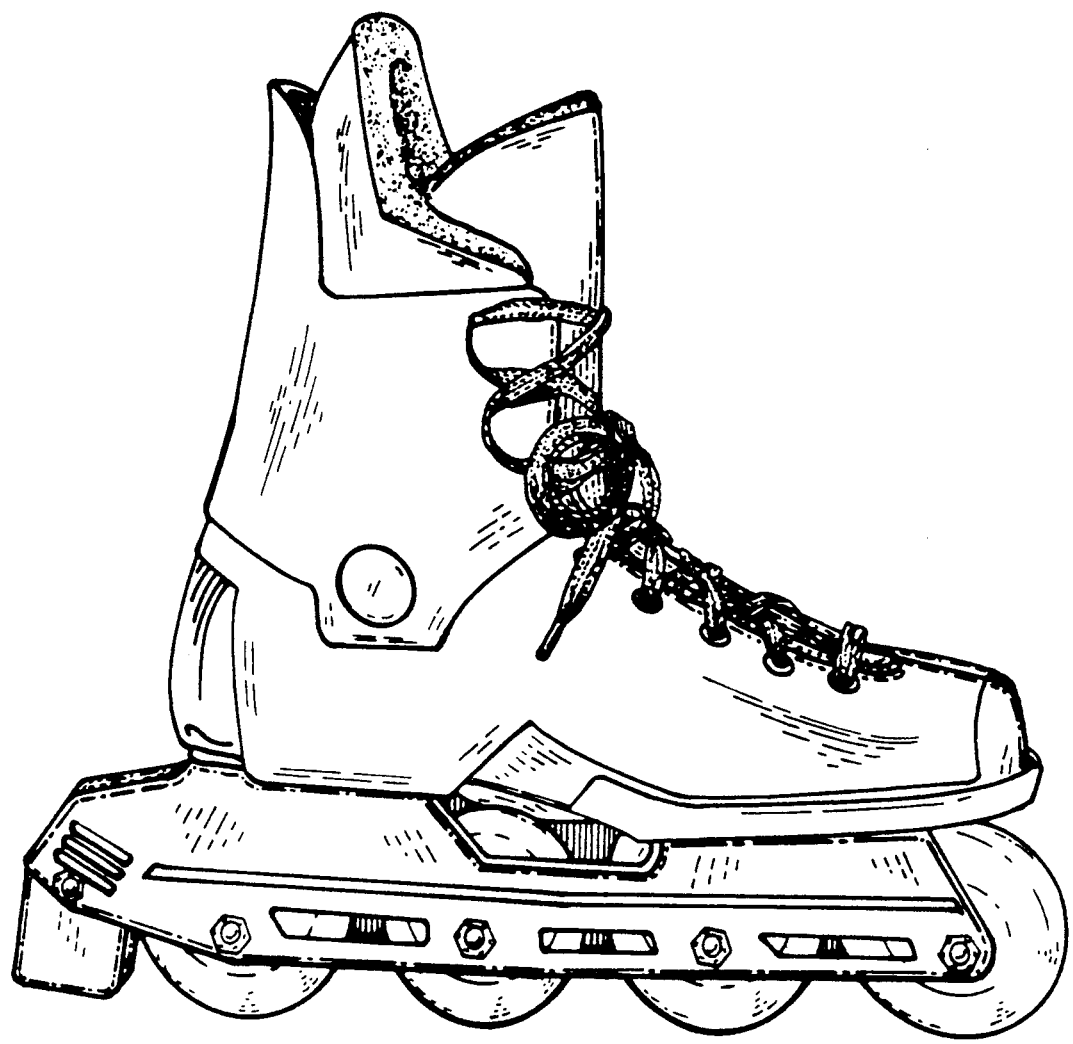
FIG. 9 is an in-line skate.

A hub 20 as shown in FIGS. 7 and 8 is inserted into the center of a mold having a size and shape suitable for in-line skates. In-line skates generally have a radius of about 1.45 to about 1.60 inches and a width of about 0.75 to about 0.95 inches. Preferably, the mold of the present invention has a volume of about 4.7 in$^3$ to about 5.3 in$^3$, preferably about 5 in$^3$. The mold also preferably contains a device for centering and maintaining the hub in the proximate center of the mold. However, one skilled in the art will recognize that the shape and size of the wheel mold may change as changes are made to the design of in-line skates and wheels.

Figure 1:
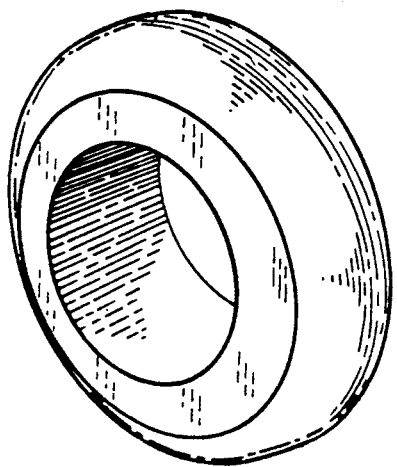
FIG. 1 is an isometric view of an in-line skate wheel produced by the method of the present invention.
Figure 2:
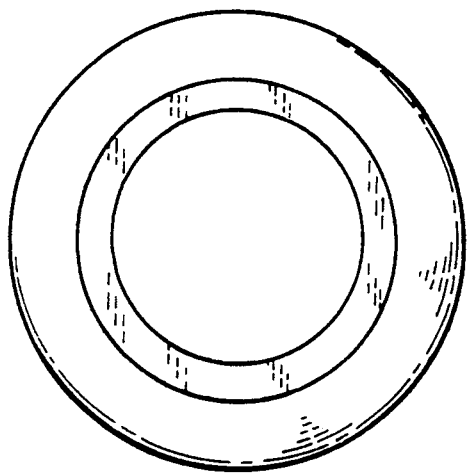
FIG. 2 is a front elevational view thereof.
Figure 3:
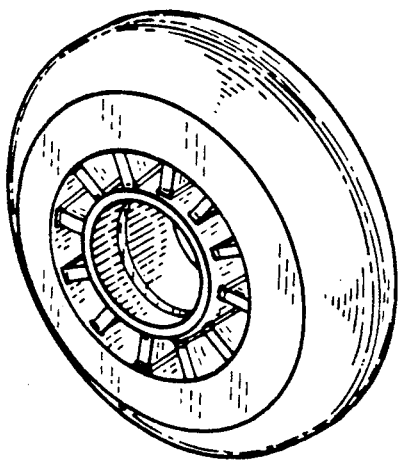
FIG. 3 is an isometric view of an in-line skate wheel produced by the method of the present invention having a spoked hub.
Figure 4:
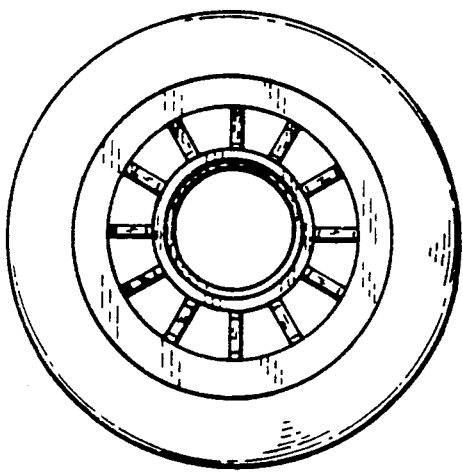
FIG. 4 is a front elevational view of an in-line skate wheel having a spoked hub.
Figure 5:
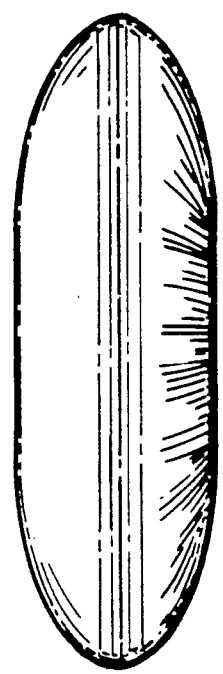
FIG. 5 is an end elevational view of the in-line skate wheel.
Figure 6:
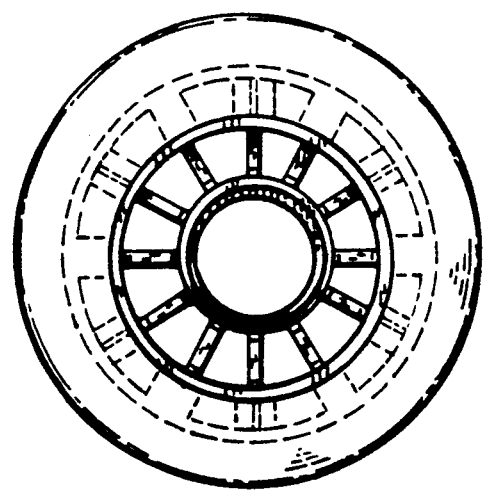
FIG. 6 is a front elevational view of the wheel with the internal hub portion shown in dashed lines.

The design of the hub is somewhat important. As shown, the outer portion 22 of the hub 20 preferably contains openings 24. During injection molding the polyurethane enters and fills the openings 24 in the outer portion 22 of the hub. FIG. 6 shows a wheel with such a hub in place. The dashed lines show the portion of the hub obscured by the polyurethane tread of the wheel. Once cured, the hub and polyurethane tread are mechanically interlocked.

The hub is preferably made of polyurethane but alternatively could be made of nylon, aluminum, or some other material suitable for an in-line skate wheel hub. Using hub and tread portions formed of like materials allows the materials to chemically bond or weld together. Thus, the need for adhesives to secure the hub to the tread is obviated. More importantly, the resulting chemical bond does not separate even after extended use. The hub polyurethane preferably has a Durometer Shore hardness of about 85 to about 89, and preferably about 87. The hub polyurethane further has a specific gravity of about 1.38 to about 1.52 and preferably about 1.45. An example of a suitable hub polyurethane is Estaloc ™ as produced by B. F. Goodrich.

A feature of the present invention is that the method produce a wheel which preferably has a tread which is both mechanically interlocked and chemically bound to the hub. Using a hub which has a functional design of the outer portion 22 similar to that shown in FIGS. 7 and 8 which is formed of polyurethane enables the tread to chemically bond and mechanically interlock with the hub. However, the method of the invention is not limited to using a mechanically interlocking or a chemically bonding hub. One skilled in the art will recognize that a polyurethane hub having a smooth outer portion will chemically bond to the polyurethane tread creating a stable in-line skate wheel.

Before injecting polyurethane into the mold, the hub-containing mold is heated to between about 50° to about 110° F. As with the injector, the mold is preferably heated by an electrical heater located in the mold or is heated by placing the mold in a furnace or by any other suitable method commonly known in the art. Preferably the mold is at about 80° to about 95° F. before injecting the polyurethane into the mold. If the mold is too cool the injected polyurethane hardens prematurely and does not flow into the entire mold resulting in a deformed product. At the very least a mold which is too cool will leave unsightly weld lines in the polyurethane. As previously stated, these lines do not affect performance of the wheel but consumers nevertheless believe the lines affect performance and they find the lines unattractive.

Once the injector, the polyurethane, and the hub-containing mold attain the preferred temperatures, the injector unit is ready to inject the hub-containing wheel mold with polyurethane. A relatively slow injection speed is preferred for the present invention. A slow injection allows the polyurethane to exhaust substantially all air from the mold as the polyurethane enters the mold. This also helps to eliminate air pockets in the final product by avoiding turbulence in the molten polyurethane.

About 46 to about 50 grams of polyurethane is injected into the wheel mold. Although a one stage injection may be practiced, a two stage injection obtains preferred results in the current invention. During the first stage of the injecting, which lasts approximately 2 to about 3 seconds, the wheel mold is substantially filled with about 43 to about 46 g of polyurethane. The polyurethane is thus injected at an average rate of about 1.5 to about 2.5 in$^3$ per second, and preferably about 2 in$^3$ per second.

To ensure that the polyurethane evenly fills the mold during the first stage of injecting, the polyurethane is injected into the mold through at least 2 entry ports or gates. The polyurethane is preferably injected through 3 gates which ar evenly spaced throughout the mold. The spacing and number of the gates helps to decrease the number of deformed wheels which are produced by the current method.

Figure 11:
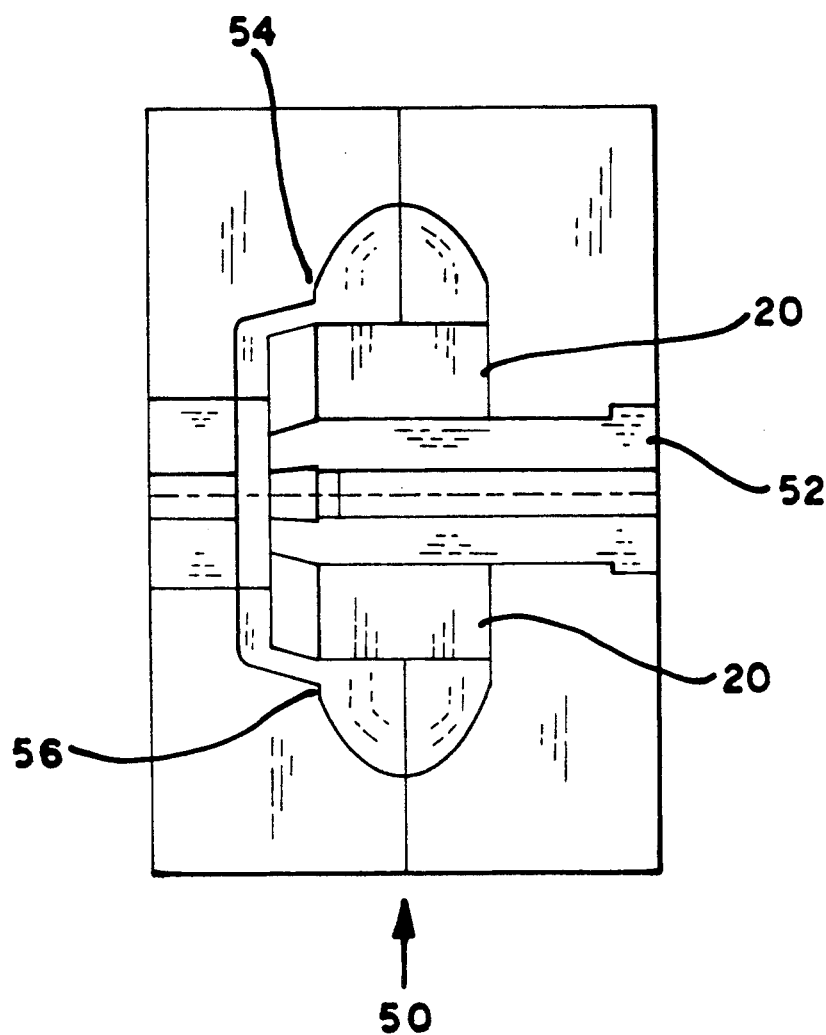
FIG. 11 is a cross-section of a mold used in the method of the present invention.

FIG. 11 shows a cross-section of a mold suitable for use in the method of the present invention. The mold is a clam shell-like mold which opens along line 50. The hub 20 is shown secured in the center of the mold by centering device 52. Two injection ports 54 and 56 are shown. The polymeric material or polyurethane enters the mold through these ports 54 and 56. One skilled in the art will recognize that the disclosed mold is one of many designs suitable to practice the inventive method.

The polyurethane is injected initially with a boost pressure of about 650 to bout 750 psi, preferably about 700 psi which starts the polyurethane to flow. After an initial boost, the pressure is reduced and maintained at about 75 to about 100 psi until the mold is substantially filled with polyurethane. An injection pressure of about 100 psi or less is essential to obtain a suitable product. Pressures exceeding 100 psi cause polyurethane hubs to collapse resulting in a deformed product.

Immediately after the first injection stage, a second shot of about 2 to about 5 g of polyurethane is injected into the mold. As stated above, during the second shot the injection pressure is reduced to about 100 psi to minimize or avoid deformation of the hub. The polyurethane-containing mold may be held under pressure for about 10 to about 20 seconds to allow even packing of the polyurethane into the mold. This helps to ensure that the resulting wheel is round.

Once the injecting is complete, the polyurethane contained in the mold is then cooled to between about 120° and about 130° F. Cooling the polyurethane allows it to cure and harden before removing it from the mold. Chilled water may be circulated through the mold in a fashion similar to an automobile radiator in order to facilitate cooling.

Once cooled, the cured polyurethane is removed from the mold and is in the shape of an in-line skate wheel. It may be necessary to machine away any extraneous polyurethane which may be attached to the wheel where the entry gates of the mold were located. The amount of machining necessary to obtain a suitable wheel is minimal as compared to the machining required to cast a molded wheel.

The cycle time required to practice the method of the invention which includes loading the hub into the mold, and injecting the polyurethane is completed in about 50 to 60 seconds.

One skilled in the art will recognize that details of the previous embodiment may be varied without departing from the spirit and scope of the invention.

We claim:

1. A method of producing injection molded in-line skate wheels, comprising the steps of:
    placing a polymeric material containing a portion of polyether type polyurethane into an injecting unit suitable for injecting molten polyurethane, heating said unit until said polymeric material is molten,
    placing a hub into a wheel mold,
    heating said hub-containing wheel mold to prevent the injected polymeric material from prematurely hardening,
    injecting said molten polymeric material into said mold under pressure,
    cooling said wheel mold containing injected molten polymeric material to harden said polymeric material.

2. The method of claim 1 wherein said hardened polymeric material is characterized by a Shore Hardness of about 72A to about 82A.

3. The method of claim 1 wherein said hardened polymeric material is characterized by a Bay Shore rebound of about 58 to about 62.

4. The method of claim 1 wherein said hardened polymeric material is characterized by a specific gravity of about 1.0 to about 1.2.

5. The method of claim 1 wherein said hub and said polymeric material are mechanically interlocked.

6. The method of claim 1 wherein said hub consists essentially of polyurethane.

7. The method of claim 6 wherein said hub and said polymeric material are chemically bonded.

8. The method of claim 1 wherein said polymeric material is heated to about 380° to about 410° F. prior to injecting said polymeric material.

9. The method of claim 1 wherein said hub-containing mold is heated from about 50° to about 100° F. before injecting said polymeric material.

10. The method of claim 1 wherein said molten polymeric material is injected at an initial boost pressure of from about 650 to about 750 psi and reduced to about 75 to about 100 psi.

11. The method of claim 1 wherein about 46 to about 50 g molten polymeric material is injected into said mold.

12. The method of claim 1 wherein said mold has a volume of about 4.7 to about 5.3 in$^3$.

13. The method of claim 1 wherein said polymeric material is injected into said mold at an average of about 1.5 to about 2.5 in$^3$ per second.

14. The method of claim 1 further including the step of holding said molten polymeric material-containing mold under about 75 to about 100 psi for about 10 to about 20 seconds.

15. The method of claim 1 further including a step of injecting more molten polymeric material into said mold after said injecting step.

16. The method of claim 1 wherein said method including said steps of injecting said polymeric material is complete in about 45 to about 65 seconds.

17. The in-line skate wheel produced by the method of claim 1.

18. The method of claim 1 wherein said injected molten polymeric material is cooled to between about 120° and about 130° F. before removing said wheel from said mold.

19. The method of claim 1 wherein said wheel mold has at least 2 entry ports and said molten polymeric material is injected into said mold through at least 2 entry ports.

20. The method of claim 19 wherein said molten polymeric material is injected into said wheel mold through 3 entry ports.

21. The method of claim 1 wherein said polymeric material is a thermoplastic polyether type polyurethane.

22. The method of claim 21 wherein said polyurethane is Estanee ® 58881.

23. A method of producing in-line skate wheels, comprising the steps of: injecting molten thermoplastic polyether type polyurethane having a Bay Shore rebound of about 60 into a mold containing a hub, said hub and said mold having a shape and size suitable for in-line skate wheels, and allowing said polyurethane to harden.

24. The method of claim 22 wherein said polyurethane is characterized by a Shore Hardness of about 78A to about 82A.

25. The method of claim 22 wherein said hub is comprised of polyurethane and said hub polyurethane and said injected polyurethane are chemically bonded.

26. The method of claim 22 further comprising the step of: mechanically interlocking said hub and said injection molded polyurethane.

27. The method of claim 22 wherein said method comprising the steps of injecting and hardening said polyurethane is complete in about 45 to about 65 seconds.

28. The in-line skate wheel produced by the method of claim 22.

29. The method of claim 22 wherein said wheel mold is characterized by at least 2 entry ports and said polyurethane is injected into said mold through at least 2 entry ports.

30. The method of claim 22 wherein said polyurethane is injected into said wheel mold through 3 entry ports.

31. A method of producing injection molded in-line skate wheels, comprising:
providing an injector unit charged with molten polyether type polyurethane,
heating said polyurethane to between about 380° and about 430° F.,
placing a hub into a wheel mold,
heating said hub-containing mold to between about 50° and about 110° F.,
injecting about 46 to about 50 g of said molten polyurethane at about 75 to about 100 psi into said mold,
cooling said polyurethane to between about 120° and about 130° F. to harden said polyurethane, and
removing said molded polyurethane from said mold.

32. The method of claim 30 wherein said wheel mold is characterized by at least 2 entry ports and said polyurethane is injected into said mold through at least 2 entry ports.

33. The method of claim 31 wherein said polyurethane is injected into said wheel mold through 3 entry ports.

34. The method of claim 30 wherein said polyurethane is Estanee ® 58881.

* * * * *